(12) United States Patent
Katukuri et al.

(10) Patent No.: US 10,489,842 B2
(45) Date of Patent: Nov. 26, 2019

(54) LARGE-SCALE RECOMMENDATIONS FOR A DYNAMIC INVENTORY

(71) Applicant: eBay Inc., San Jose, CA (US)

(72) Inventors: Jay Katukuri, Santa Clara, CA (US); Rajyashree Mukherjee, Santa Clara, CA (US); Tolga Konik, Menlo Park, CA (US); Santanu Kolay, San Jose, CA (US)

(73) Assignee: EBAY INC., San Jose, CA (US)

( * ) Notice: Subject to any disclaimer, the term of this patent is extended or adjusted under 35 U.S.C. 154(b) by 979 days.

(21) Appl. No.: 14/102,100

(22) Filed: Dec. 10, 2013

(65) Prior Publication Data

US 2015/0095185 A1     Apr. 2, 2015

Related U.S. Application Data

(60) Provisional application No. 61/884,676, filed on Sep. 30, 2013.

(51) Int. Cl.
*G06Q 30/06* (2012.01)
*G06F 16/248* (2019.01)
*G06F 16/2457* (2019.01)
*G06F 16/9535* (2019.01)

(52) U.S. Cl.
CPC ....... *G06Q 30/0631* (2013.01); *G06F 16/248* (2019.01); *G06F 16/24578* (2019.01); *G06F 16/9535* (2019.01)

(58) Field of Classification Search
CPC ............ G06Q 30/0631; G06F 16/9535; G06F 16/24578; G06F 16/248

USPC ......................................................... 705/26.7
See application file for complete search history.

(56) References Cited

U.S. PATENT DOCUMENTS

| | | | |
|---|---|---|---|
| 8,781,916 B1 * | 7/2014 | Buryak | G06Q 30/0631 705/26.7 |
| 2004/0230566 A1 * | 11/2004 | Balijepalli | G06F 17/30864 |
| 2005/0165648 A1 * | 7/2005 | Razumov | G06Q 30/0603 705/26.41 |
| 2008/0120292 A1 * | 5/2008 | Sundaresan | G06F 17/3071 |
| 2010/0268661 A1 * | 10/2010 | Levy | G06Q 30/02 705/347 |

(Continued)

OTHER PUBLICATIONS

Anonymous, One Stop Optimizes Selling Space with Galleria Customer-Centric Merchandising Solutions, Jun. 22, 2010, Business Wire, pp. 1-2. (Year: 2010).*

*Primary Examiner* — Jason B Dunham
*Assistant Examiner* — Brittany E Bargeon
(74) *Attorney, Agent, or Firm* — Shook, Hardy & Bacon, L.L.P.

(57) ABSTRACT

A system comprising a computer-readable storage medium storing at least one program and a computer-implemented method for providing recommendations are presented. Consistent with some embodiments, the method may include accessing a selection of queries executed on a database of items. The selection of queries may be used to retrieve a plurality of items from the database. The plurality of items may be grouped into one of multiple clusters based on similarities between items. The method may further include receiving a recommendation request related to an item corresponding to a first cluster of the multiple clusters. A recommendation may be generated using a related item selected from the first cluster.

20 Claims, 11 Drawing Sheets

(56) References Cited

U.S. PATENT DOCUMENTS

2011/0225161 A1* 9/2011 Zhong ................ G06F 16/355
                                                                707/740
2014/0258330 A1* 9/2014 Cheng ............. G06F 16/90335
                                                                707/771

* cited by examiner

FIG. 5

LARGE-SCALE RECOMMENDATIONS FOR A DYNAMIC INVENTORY

PRIORITY

This application is a Non-Provisional of and claims the benefit of priority under 35 U.S.C. § 119(e) from U.S. Provisional Application Ser. No. 61/884,676, entitled "LARGE-SCALE RECOMMENDATIONS IN A DYNAMIC MARKETPLACE," filed on Sep. 30, 2013 which is hereby incorporated by reference herein in its entirety.

TECHNICAL FIELD

This application relates to data processing. In particular, example embodiments may relate to systems and methods for providing recommendations.

BACKGROUND

Recommender systems are gaining wide popularity in e-commerce as they are becoming major drivers of incremental business value and user satisfaction. Existing recommender systems address recommendations in a stable collection of catalogued items. For example, the recommender system provided by Amazon® recommends products from a stable catalogue of products that do not expire for a long time period. In the case of Netflix® recommendations, recommended movies are selected from a stable cataloged collection. These traditional recommendation systems are based on pre-computing item-item relationships using collaborative filtering methods. Collaborative filtering methods compute an item-item matrix using user behavioral data such as co-purchases or co-views.

However, building a recommendation engine for a large open marketplace (e.g., eBay.com) with dynamic and uncatalogued items may present many challenges. For example, in large open marketplaces such as eBay the majority of listings for items are unstructured and the listings are also short-lived as the items are often purchased within 1-2 weeks of availability. Hence, pre-computing recommendations using traditional techniques like item-item collaborative filtering is not feasible. On the other hand, a solution based on completely online computation is not scalable. Another challenge in an open marketplace setting is that recommendation systems also need to address factors like seller trustworthiness and item quality.

BRIEF DESCRIPTION OF THE DRAWINGS

Various ones of the appended drawings merely illustrate example embodiments of the present invention and cannot be considered as limiting its scope.

FIG. 5 is an interface diagram illustrating a similar item recommendation provided by the recommendation application, consistent with some embodiments.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure include a recommendation system architecture for a dynamic network-based content publisher that employs a highly scalable method for clustering an inventory of items using user queries as seeds. Further aspects of the present disclosure also address several challenges in providing recommendations in an open marketplace. For example, the recommendation system architecture may handle open-ended and rapidly changing user-generated item listings in the absence of catalogue taxonomy to support them. The recommendation system architecture may also control the trade-off between relevance and predicted quality of item recommendations. The predicted quality may be affected by factors such as price, item condition, and seller trustworthiness, and it is a particularly important challenge in an open marketplace setting, for example.

Some embodiments of the present disclosure involve cluster definitions learned from historical user queries that may map dynamic items (e.g., user listings) into static cluster identifiers. This functionality enables separate processing for computationally intensive offline cluster modeling, which in turn provides a more efficient runtime performance. Although computationally expensive, the offline cluster modeling is a highly parallelizable process because it is based on local clustering of items as partitioned by stored user queries. A runtime system included as part of the recommendation system architecture may efficiently combine the cluster models with dynamic features on the network-based content publisher. As a result, the recommendation system may cover hundreds of millions of active items in an inventory while serving a very large volume of users.

Figure 1:
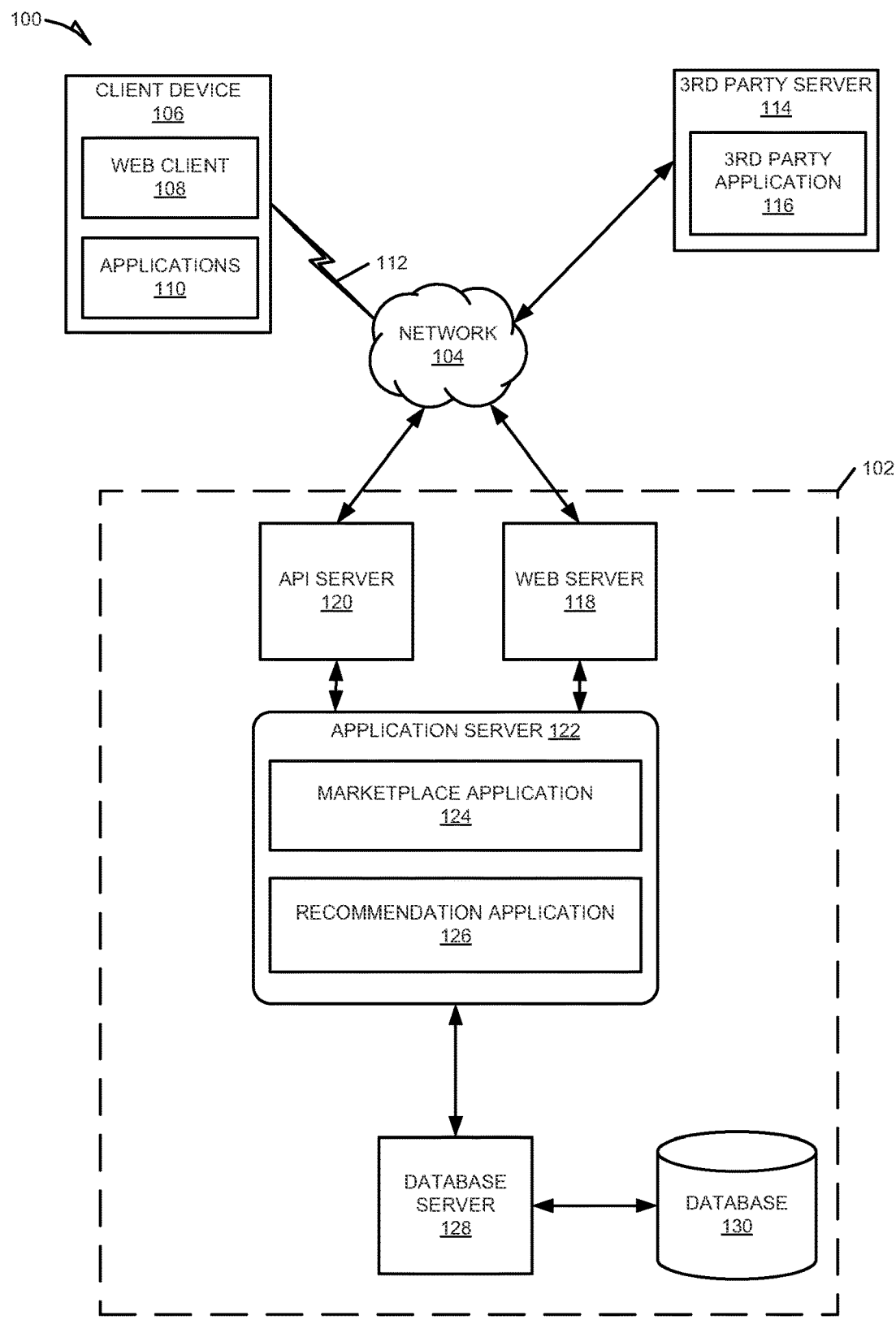
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network. The network system 100 may include a network-based content publisher 102 in communication with a client device 106 and third party server 114. For example, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client device 106). The one or more client devices may be operated by users that use the network system 100 to exchange data over a network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanged within the network system 100 may be dependent upon user-selected functions available through one or more client or user interfaces (UIs). The UIs may be associated with a client device, such as the client device 106 using web client 108. The web client 108 may be in communication with the network-based content publisher 102 via a web server 118. The UIs may also be associated with one or more applications 110 executing on the client device 106, such as a client application in communication with the network-based content publisher 102, or a third party server 114 (e.g., one or more servers or client devices) hosting a third party application 116.

The client device 106 may be any of a variety of types of devices. For example, the client device 106 may a mobile device such as a smartphone such as an iPhone® or other mobile device running the iOS® operating system, the Android® operating system, a BlackBerry® operating system, the Microsoft® Windows® Phone operating system, Symbian® OS, or webOS®. Consistent with some embodiments, the client device 106 may alternatively be a tablet computer, such as an iPad® or other tablet computer running one of the aforementioned operating systems. In some embodiments, the client device 106 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii®, the Microsoft Xbox 360®, or the Sony PlayStation 3®, or other video game system consoles.

The client device 106 may interface via a connection 112 with the communication network 104 (e.g., the Internet or wide area network (WAN)). Depending on the form of the client device 106, any of a variety of types of connection 112 and communication networks 104 may be used. For example, the connection 112 may be Code Division Multiple Access (CDMA) connection, a Global System for Mobile communications (GSM) connection, or other type of cellular connection. Such a connection 112 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 112 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 112 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates the third party application 116 executing on the third party server 114 that may offer one or more services to users of the client device 106. The third party application 116 may have programmatic access to the network-based content publisher 102 via the programmatic interface provided by an application program interface (API) server 120. In some embodiments, the third party application 116 may be associated with any organization that may conduct transactions with or provide services to the users of the client device 106.

Turning specifically to the network-based content publisher 102, the API server 120 and a web server 118 are coupled to, and provide programmatic and web interfaces respectively to, one or more application servers 122. The application server 122 may, for example, host one or more marketplace applications 124, which may provide a number of marketplace functions and services to users that access the network-based content publisher 102. The application servers 122 may also host one or more recommendation applications 126, which may provide recommendation services and functions to users. Each recommendation application 126 may provide similar item recommendations and related item recommendations. Consistent with some embodiments, the similar item recommendations may be provided in the context of a pre-purchase recommendation, and the related item recommendations may be provided in the context of post-purchase recommendations. In the pre-purchase scenario, the recommendation application 126 may recommend items that are suitable alternatives for an item that a user is viewing. In the post-purchase scenario, items presented in a recommendation may be items complementary to an item a user has recently purchased.

The application servers 122 may be coupled via the API server 120 and the web server 118 to the communication network 104, for example, via wired or wireless interfaces. The application servers 122 are, in turn, shown to be coupled to a database server 128 that facilitates access to a database 130. In some examples, the application servers 122 can access the database 130 directly without the need for a database server 128. In some embodiments, the database 130 may include multiple databases that may be internal or external to the network-based content publisher 102.

The database 130 may store data pertaining to various functions and aspects associated with the network system 100 and its users. Consistent with some embodiments, the database 130 may store continuously accumulated raw data related to data exchanges occurring within the context of the network system 100 along with the resulting state of the network-based content publisher 102. In addition, the database 130 may store multiple models, which may contain generalized knowledge that may be applied to new situations. Consistent with some embodiments, the various data stored in the database 130 may be categorized as inventory data, behavioral data, or transaction data. The inventory data may contain a set of items and the static attributes of each (e.g., an item title). In some embodiments, the inventory data may be unstructured and dynamic. The behavioral data may include user actions taken in the context of network-based content publisher 102 (e.g., clickstream data) and the resulting state of the network-based content publisher 102. The transaction data may include information related to transactions for items offered for sale by merchants via marketplace applications 124. The transaction information may, for example, include a description of a product purchased by the user, an identifier of the product, a category to which the product belongs, a purchase price, a quantity, or a number of bids. In some embodiments, the database 130 may also include a conceptual knowledge base including a category tree, which is a hierarchical ontology that organizes items contained in the inventory, language specific knowledge sources (e.g., stop words, spell correction rules, etc.), and a term dictionary that lists important terms and phrases in a given category.

While the marketplace application 124 and the recommendation application 128 are shown in FIG. 1 to all form part of the network-based content publisher 102, it will be appreciated that, in alternative embodiments, the recommendation application 128 may form part of a service that is separate and distinct from the network-based content publisher 102. Further, while the system 100 shown in FIG. 1 employs client-server architecture, the present inventive subject matter is, of course, not limited to such an architecture, and could equally well find application in an event-driven, distributed, or peer-to-peer architecture system, for example. The various modules of the application servers 122 may also be implemented as standalone systems or software programs, which do not necessarily have networking capabilities.

Figure 2A:
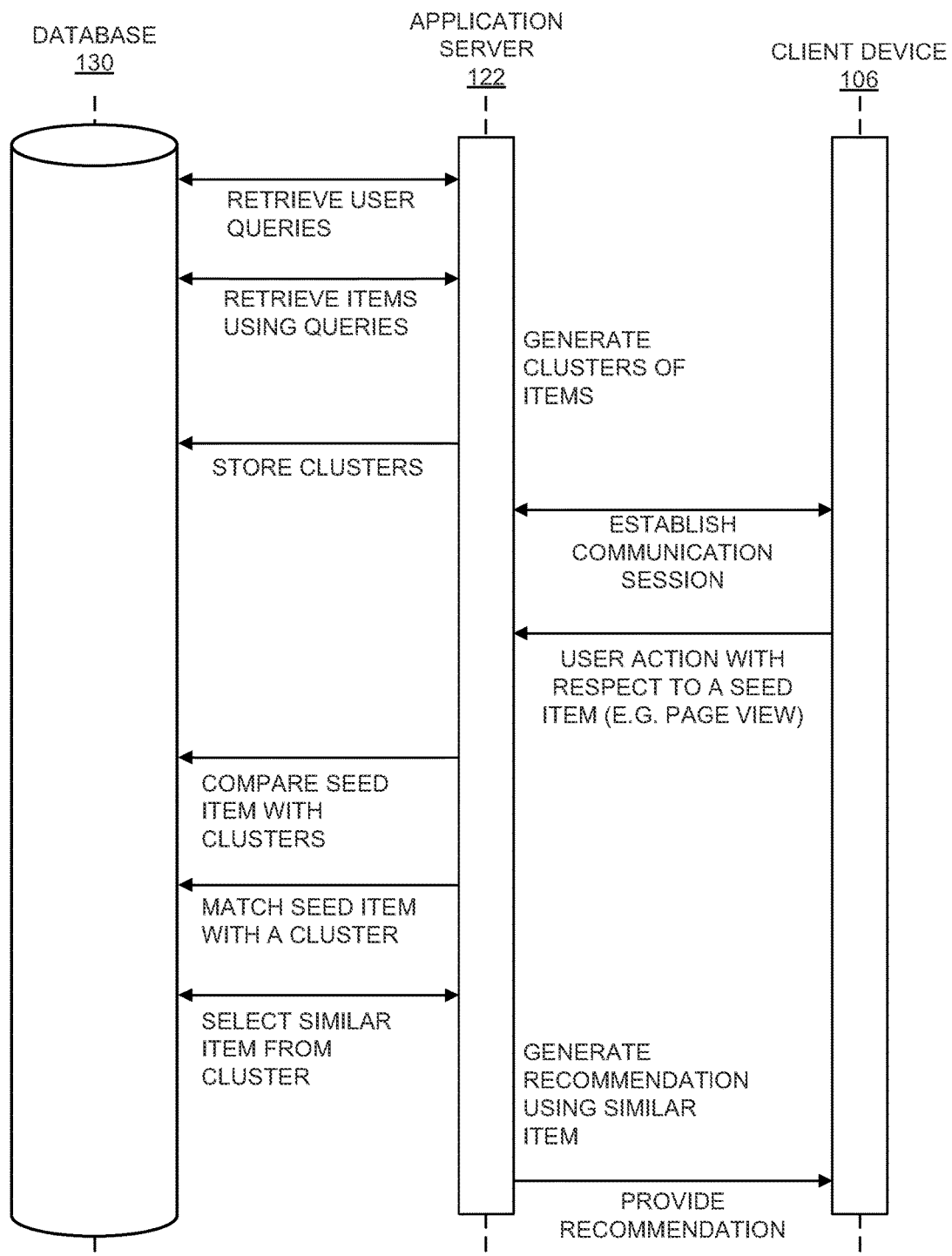
FIG. 2A is an interaction diagram depicting example exchanges between an application server, a database, and a client device during a provisioning of a similar item recommendation, consistent with some embodiments.

FIG. 2A is an interaction diagram depicting example exchanges between an application server, a database, and a client device during a provisioning of a similar item recommendation, consistent with some embodiments. In particular, FIG. 2A depicts example exchanges between the application server 122, the database 130, and the client device 106. As shown, the application server 122 may retrieve past user queries stored in the database 130 as part of the behavioral data. The application server 122 may then retrieve a set of items from the inventory data stored in database 130 using the retrieved user queries. The application server 122 may generate multiple clusters by grouping the set of items based on similarity. The generated cluster collectively represents cluster definitions that may then be stored by the application server 122 in the database 130 as cluster definitions. Each of the stored cluster definitions may be identified by a static cluster identifier. Consistent with some embodiments, the operations discussed above with reference to FIG. 2A may be periodically performed offline outside of the context of an established communication session with a client device or third party server.

As shown in FIG. 2A, the client device 106 may establish a communication session with the application server 122 to utilize any one of the functions and services provided by the applications server 122 discussed herein. As part of the communication session, the application server 122 may receive a user action from the client device 106 taken with respect to a seed item. For example, the client device 106 may transmit a page view request to the application server 122 for a web page (e.g., a marketplace listing for an item) corresponding to the seed item. The application server 122 may then access the stored clusters and compare the seed item with the clusters to determine a matching cluster for the seed item. Once the matching cluster is identified, the application server 122 may select an item from the matching cluster that is similar to the seed item. The application server 122 may then generate a recommendation using the similar item. The generated recommendation may then be provided to the user. The generated recommendation may, for example, be provided in conjunction with a web page corresponding to the seed item.

Figure 2B:
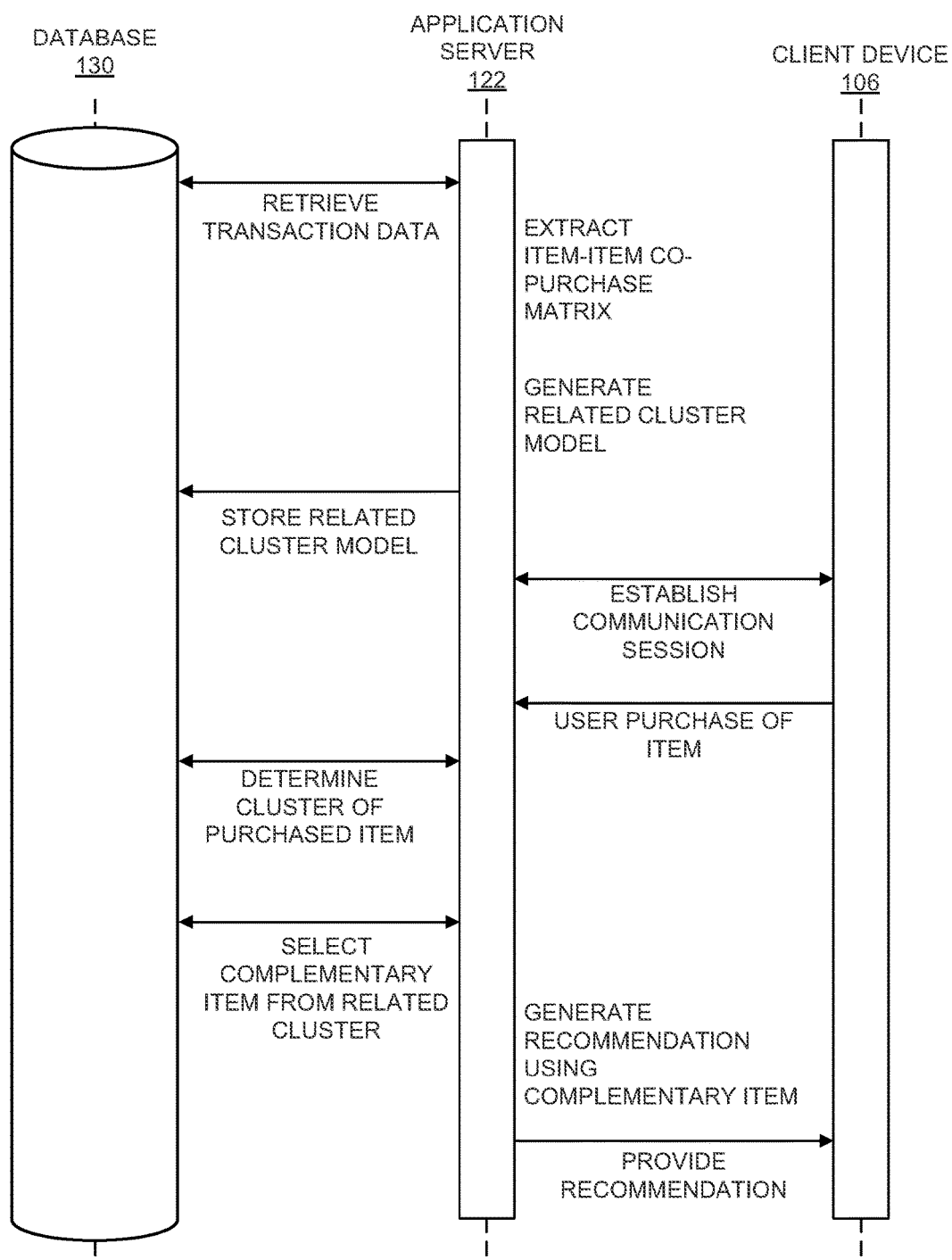
FIG. 2B is an interaction diagram depicting example exchanges between an application server, a database, and a client device during a provisioning of a related item recommendation, consistent with some embodiments.

FIG. 2B is an interaction diagram depicting example exchanges between an application server, a database, and a client device during a provisioning of a related item recommendation, consistent with some embodiments. In particular, FIG. 2B depicts example exchanges between the application server 122, the database 130, and the client device 106. As shown, the application server 122 may retrieve the transaction data stored in the database 130. From the transaction data, the application server 122 may extract an item-item co-purchase matrix that indicates which set of items have been purchased by individual users at the same time or within a threshold time period. The application server 122 may then generate a related cluster model from the item-item co-purchase matrix, which represents a sparse graph between clusters. For example, a strong link from one cluster to another indicates that the likelihood of buying an item from the second cluster increases after buying an item from the first cluster. The application server 122 may then store the related cluster model in the database 130. Consistent with some embodiments, the operations discussed above with reference to FIG. 2B may be periodically performed offline outside of the context of an established communication session with a client device or third party server.

As shown in FIG. 2B, the client device 106 may establish a communication session with the application server 122 to utilize any one of the functions and services provided by the applications server 122 discussed herein. As part of the communication session, the application server 122 may receive confirmation that a user of the client device 106 has purchased an item. The application server 122 may then access the database 130 to determine a cluster to which the purchased item belongs. The application server 122 may use the related cluster model to select a complementary item from a cluster related to the cluster to which the purchased item belongs. The generated recommendation may then be provided to the client device 106.

Figure 3:
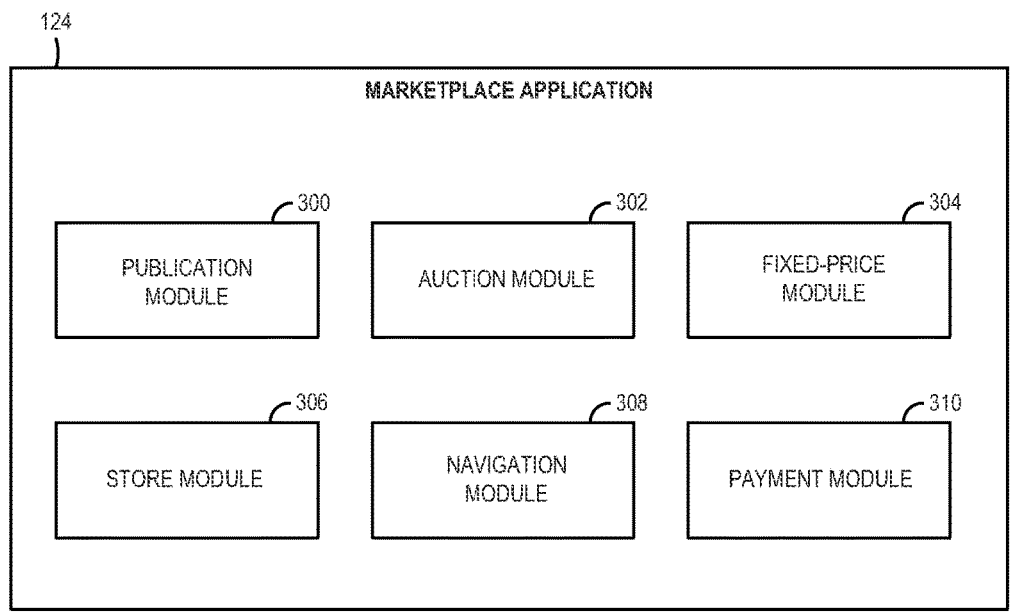
FIG. 3 is a block diagram illustrating an example embodiment of multiple modules forming a marketplace application, which is provided as part of the network system of FIG. 1.

FIG. 3 is a block diagram illustrating an example embodiment of multiple modules forming the marketplace application 124, which is provided as part of the network system of FIG. 1. The modules of the marketplace application 124 may be hosted on dedicated or shared server machines that are communicatively coupled to enable communications between server machines. Each of the modules 300-310 are communicatively coupled (e.g., via appropriate interfaces) to each other and to various data sources, so as to allow information to be passed between the modules 300-310 of the marketplace application 124 or so as to allow the modules 300-310 to share and access common data. The various modules of the marketplace applications 124 may furthermore access one or more databases 130.

The marketplace application 124 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 124 are shown to include at least one publication module 300 and one or more auction modules 302, which support auction-format listing and price setting mechanisms (e.g., English, Dutch, Vickrey, Chinese, Double, Reverse auctions etc.). The various auction modules 302 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 304 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store modules 306 may allow sellers to group their product listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based content publisher 102 may be facilitated by one or more navigation modules 308. For example, a search module may, inter alia, enable key word searches of listings published via the content publisher 102. A browser module may allow users via an associated UI to browse various category, catalogue, inventory, social network, and review data structures within the network-based content publisher 102. Various other navigation modules 308 (e.g., an external search engine) may be provided to supplement the search and browsing modules. Consistent with some embodiments, the results for key word searches of listings published via the content publisher 102 may be filtered to include only listings corresponding to social network connections of the user (e.g., indicated friends and family).

In one embodiment, the navigation module 308 may provide an electronic shopping cart to be used by users of the network-based content publisher 102 to add and store products (e.g., goods and services) listed by the store modules 306. The electronic shopping cart may also be used to "check out," meaning a user may purchase products in the electronic shopping cart. The electronic shopping cart may facilitate the transactions by automatically finding the products in the electronic shopping cart across at least one or all of a predefined set of vendors, a comparison shopping site, an auction site, and the like. In various embodiments, the selection criteria for which vendor or vendors to purchase from may include, but is not limited to, criteria such as lowest cost, fastest shipping time, preferred or highest rated vendors or sellers, or any combination thereof.

As illustrated in FIG. 3, the marketplace applications 124 may include one or more payment modules 310 that may provide a number of payment services and functions to users. The payment modules 310 may allow users to accumulate value (e.g., in a commercial currency, such as the U.S. dollar, or a proprietary currency, such as "points") in accounts, and then later to redeem the accumulated value for products (e.g., goods or services) that are made available via the payment modules 310. For some example embodiments, the payment modules 310 generally enable transfer of values (e.g., funds, reward points, etc.) from an account associated with one party (e.g., a sender) to another account associated with another party (e.g., a receiver).

Figure 4:
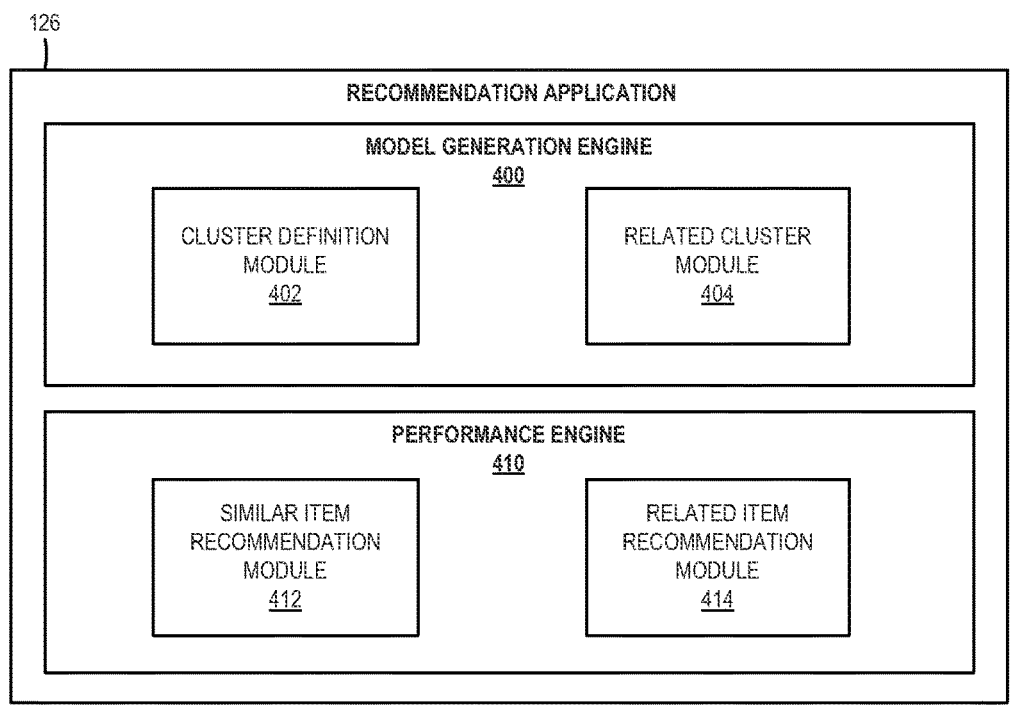
FIG. 4 is a block diagram illustrating an example embodiment of multiple modules forming a recommendation application, which is provided as part of the network system of FIG. 1.

FIG. 4 is a block diagram illustrating an example embodiment of multiple modules forming the recommendation application 126, which is provided as part of the network system of FIG. 1. As illustrated in FIG. 4, the recommendation application 126 may be comprised of a model generation engine 400 and a performance engine 410. The various components of the recommendation application 126 may be hosted on dedicated or shared server machines that are communicatively coupled to enable communications between server machines. Each of the components forming the recommendation application 126 are communicatively coupled (e.g., via appropriate interfaces) to each other and to various data sources, so as to allow information to be passed between the each of the components or so as to allow the components to share and access common data. The various components of the recommendation applications 126 may furthermore access the databases 130.

Consistent with some embodiments, the model generation engine 400 may generate models by conducting computationally intensive offline analyses. The model generation engine 400 may generate two main output models: 1) cluster definitions and 2) a related cluster model. To this end, the model generation engine 400 is illustrated to include a cluster definition module 402 to generate cluster definitions, and a related cluster module 404 to generate the related cluster model. The cluster definitions generated by the cluster definition module 402 may represent groups of conceptually similar items. The related cluster model represents relationships between clusters.

In generating the cluster definitions, the cluster definition module 402 may access historical (e.g., past) user queries from the behavioral data stored in database 130. The particular queries selected by the cluster definition module 402 may be based on the number of items in the database 130 satisfying each query or the frequency of occurrence of each query. The cluster definition module 402 may use the historical user queries to retrieve a set of items from the inventory data stored in database 130. The retrieved set of items may be unstructured and may correspond to an uncatalogued product offered for sale, consistent with some embodiments. The set of items may then be grouped into one of multiple clusters according to features that each item may have in common with another item. In some embodiments, these features may, for example, include titles of the items, attributes used to describe the items, and the category hierarchy of each item. Consistent with some embodiments, the grouping of items into clusters may comprise applying a clustering algorithm (e.g., k-means clustering algorithm) to the set of items to split the set of items into meaningful clusters. Further, duplicate clusters may be removed from the resulting clusters and some clusters may be merged with other clusters in which there is a high overlap.

In generating the related cluster model, the related cluster module 404 may access the transaction data stored in the database 130. The related cluster module 404 may extract an item-item co-purchase matrix from the transaction data. The item-item co-purchase matrix represents groupings of items purchased together or within a predefined time period by multiple individuals. The related cluster module 404 may then generate a cluster-cluster graph by applying cluster assignment (e.g., based on the stored cluster definitions) on the item-item co-purchase matrix. In the resulting cluster-cluster graph, an edge from a cluster 'i' to cluster 'j' indicates that a group of users have purchased items in cluster 'j' after buying items in cluster 'i'. For each node in the cluster-cluster graph, the application server 122 may provide a ranking for the outgoing edges to create a related cluster graph. The ranking of the outgoing edges may be based on a number of users who co-purchased items from the respective clusters or a similarity between two clusters. The resulting graph is the related cluster model.

The performance engine 410 may be configured to provide item recommendations. Accordingly, the performance engine 410 may receive a seed item as an input and return sets of items that are similar or related to the seed item. The recommendations provided by the performance engine 410 may be either similar item recommendations or related item recommendations. To provide both types of recommendations, the performance engine 410 may include a similar item recommendation (SIR) module 412 and a related item recommendation (RIR) module 414.

In generating recommendations, the performance engine 410 may be configured to determine a best matching cluster for a particular item based on the cluster definitions generated by the cluster definition module 402. To achieve this determination, the performance engine 410 compiles normalized versions of cluster expressions in an index (e.g., a lucene index). Further, the performance engine 410 may perform a similar normalization to the input item title and other features (e.g. category, attribute-value pair) of the item to return the best matching clusters. By using a union of the best matching clusters, the SIR module 412 may create a search query. The SIR module 412 may use this search query to locate and retrieve active items from the inventory data stored in the database 130. The SIR module 412 may then generate a similar item recommendation using these items.

Similarly, the RIR module 414 may utilize the related cluster model generated by the related cluster module 404 to retrieve a number of related clusters and construct a number of separate queries for each related cluster. The RIR module 414 may use these queries to locate and retrieve active items from the inventory data stored in the database 130. Each of the retrieved items may be used by the RIR module 414 to generate a related item recommendation. While the SIR module 412 may return a plurality of similar items as its recommendations, the RIR module 414 may return one item per each query it has constructed to ensure that each recommendation is related to the seed item in a different way.

Figure 5:
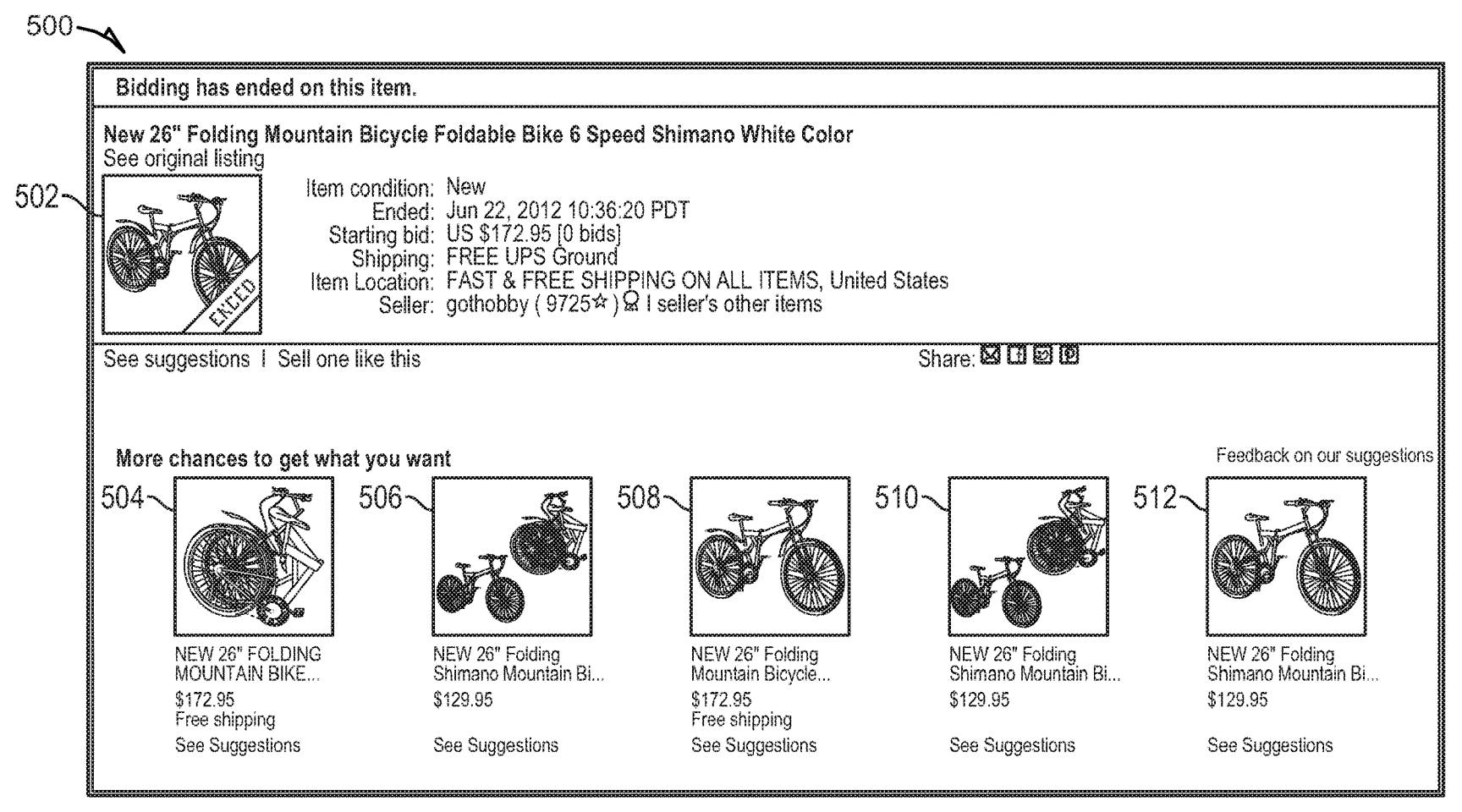

FIG. 5 is an interface diagram illustrating a similar item recommendation provided by the recommendation application 126, consistent with some embodiments. In particular, FIG. 5 illustrates a portion of a web page 500 corresponding to an auction listing for an item 502. As shown, the bidding process for the auction of item 502 has ended. In response to the bidding for the item 502 having ended, a request for a similar item recommendation may be generated (e.g., by the marketplace application 124) and transmitted to the recommendation application 126. The recommendation application 126 may then use the cluster definitions generated by the cluster definition modules 402 to determine a matching cluster for the item 502. The SIR module 412 may use the matching cluster to identify similar items to the item 502 to use in generating the similar item recommendation. As illustrated in this example embodiment, similar items 504-512 have been selected by the SIR module 412 from the cluster corresponding to the item 502. In turn, the similar items 504-512 are provided by the SIR module 412 as part of the similar item recommendation presented as part of the web page 500.

Figure 6:
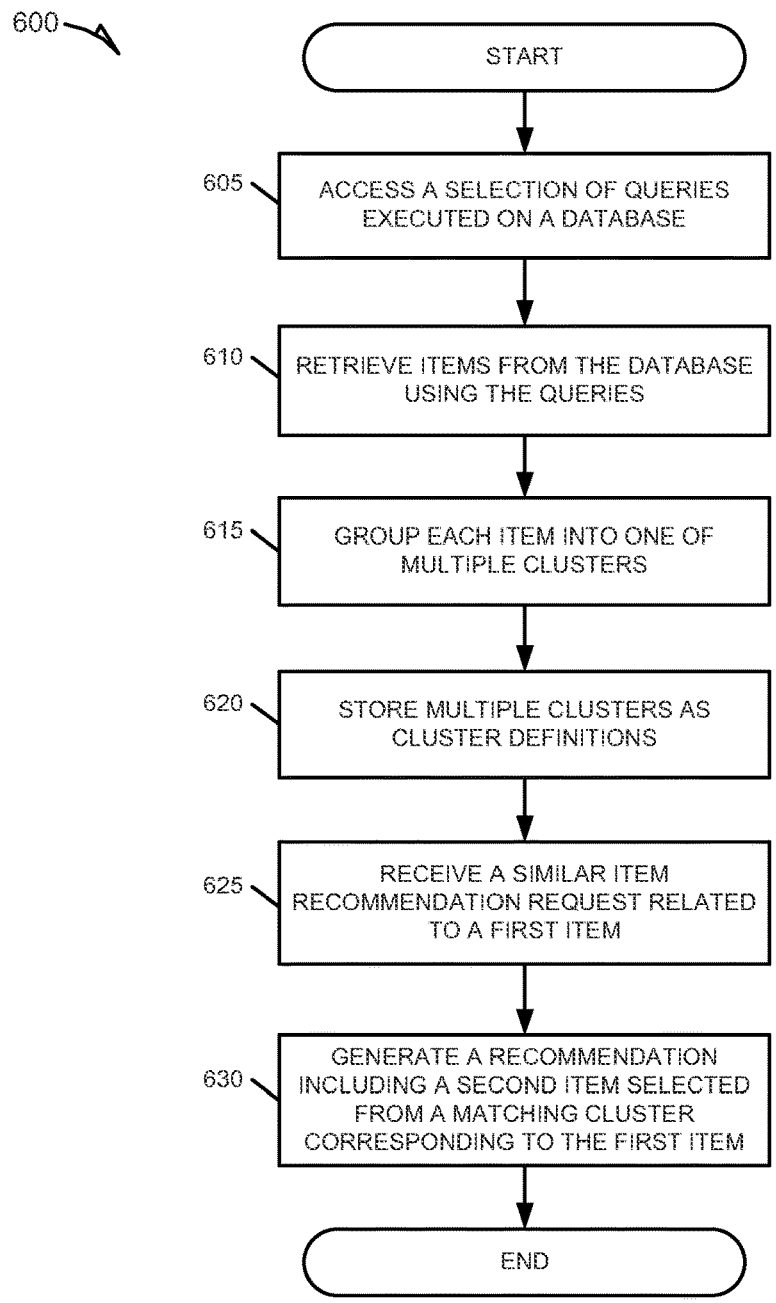
FIG. 6 is a flowchart illustrating an example method of provisioning a similar item recommendation, consistent with some embodiments.

FIG. 6 is a flowchart illustrating an example method 600 of provisioning a similar item recommendation, consistent with some embodiments. The method 600 may be embodied in computer-readable instructions for execution by one or more processors such that the steps of the method 600 may be performed in part or in whole by the application server 122, and in particular, the modules comprising the recommendation application 126.

At operation 605, the cluster definition module 402 may access a selection of queries (e.g., historical user queries) stored in and performed on the database 130. The particular queries included in the selection of queries may be based on a frequency of occurrence of the query or a number of items retrieved using the query being above a predefined threshold value. Further, certain queries stored in the database 130 may be excluded from the selection of queries based on morphological constraints (e.g., queries having numbers or special characters). The cluster definition module 402 may use the selection of queries to retrieve a number of items from the database 130, at operation 610. The items may, for example, correspond to products (e.g., goods and services) offered for sale, web pages, blogs, articles, books, movies, songs, images, or other similar content. Consistent with some embodiments, each of the retrieved items may be an ad hoc entry not covered by a catalog taxonomy. Each item may nonetheless include a title, and at least one attribute, consistent with some embodiments. Each item may also be assigned to a category of items (e.g., category or products, music genre, movie genre, etc.).

At operation 615, the cluster definition module 402 may group each of the retrieved items into one of multiple clusters according to a similarity between items. The grouping of the items into the multiple clusters may comprise creating granular clusters of items using similar characteristics (e.g., keywords in title, attributes, or item categories) of each item. The cluster definition module 402 may then remove duplicate granular clusters and merge similar granular clusters to create the multiple clusters. The resulting clusters may then be stored in the database 130 as cluster definitions. Further details of the steps comprising operation 615 are illustrated in FIG. 7, consistent with some embodiments.

Figure 7:
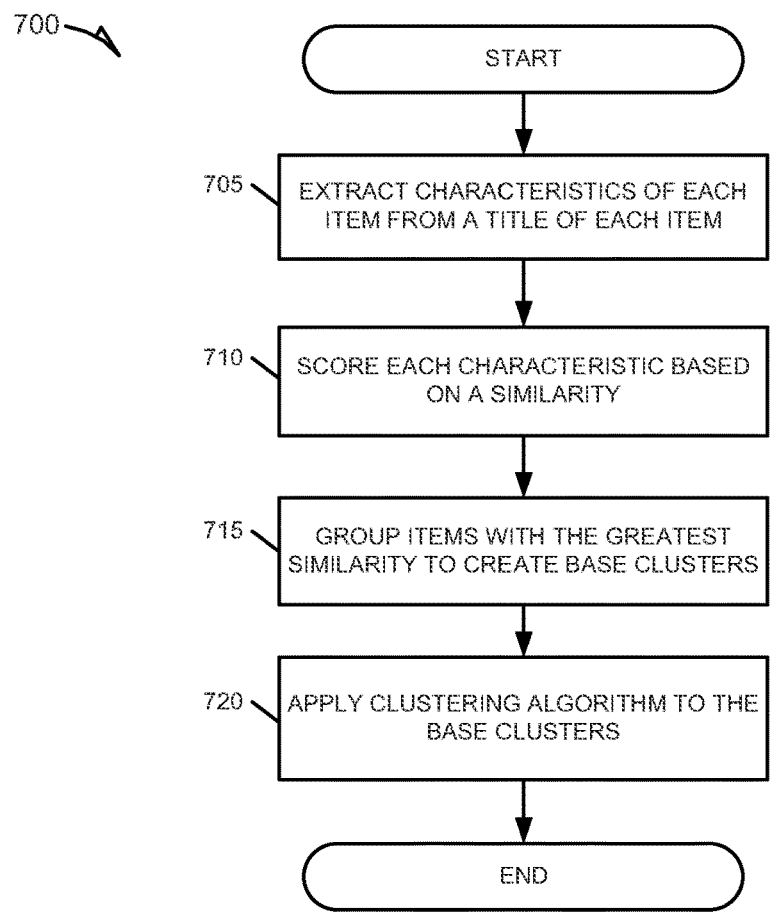
FIG. 7 is a flowchart illustrating an example method of grouping items into multiple clusters, consistent with some embodiments.

FIG. 7 is a flowchart illustrating an example method 700 of grouping items into multiple clusters, consistent with some embodiments. Consistent with some embodiments, the method 700 may correspond to the operation 615. The method 700 may be embodied in computer-readable instructions for execution by one or more processors such that the steps of the method 700 may be performed in part or in whole by the application server 122, and in particular, the cluster definition module 402.

At operation 705, the cluster definition module 402 may extract one or more characteristics (e.g., terms used in a query that resulted in the retrieval of a particular item) from a title of each item retrieved in operation 610. At operation 710, the cluster definition module 402 may score each extracted characteristic according to the significance of each characteristic. In some embodiments, the significance of a particular characteristic may be based on its similarity to other characteristics. In some embodiments, scoring each characteristic may comprise determining a cosine similarity between each extracted characteristic. At operation 715, the cluster definition module 402 may group together items with the highest similarity score to create base clusters. At operation 720, the cluster definition module 402 may apply a clustering algorithm to the base clusters to create the multiple clusters. In some embodiments, the k-means clustering algorithm may be used. The size of each resulting cluster may be a predefined tuning parameter.

Returning back to FIG. 6, at operation 620, the multiple clusters generated by the cluster definition module 402 are stored in the database 130 as the cluster definitions. Each of the operations 605-620 may be repeatedly performed on a periodic basis so as to maintain updated cluster definitions.

At operation 625, a similar item recommendation request related to a first item may be received. For example, the similar item request may be generated in response to a user viewing an item or a web page associated with the item. In another example, the similar item recommendation request may be generated in response to a user bidding on an item in an auction, but not winning the auction. In yet another example, the similar item recommendation request may be generated in response to a marketplace listing for an item that a user has added to a wish list or watch list becoming unavailable. At operation 630, the similar item recommendation module 412 may generate a recommendation including a second item selected from a matching cluster corresponding to the first item. Further details related to the steps of operation 630 are discussed in reference to FIG. 8.

Figure 8:
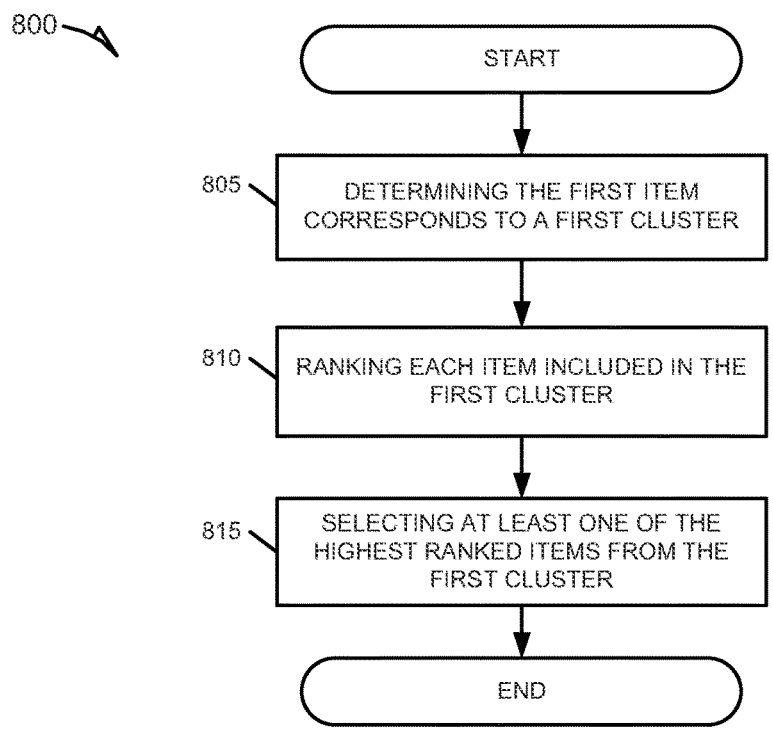
FIG. 8 is a flowchart illustrating an example method for generating a recommendation, consistent with some embodiments.

FIG. 8 is a flowchart illustrating an example method 800 for generating a recommendation, consistent with some embodiments. The method 800 may correspond to the operation 630. The method 800 may be embodied in computer-readable instructions for execution by one or more processors such that the steps of the method 800 may be performed in part or in whole by the application server 122, and in particular, the SIR module 412.

At operation 805, the SIR module 412 may use the cluster definitions stored in database 130 to determine a matching cluster corresponding to the first item. Consistent with some embodiments, this determination may comprise generating normalized expressions using the cluster definitions. These normalized search expressions may be compiled and stores in an index (e.g., a lucene index). Further, a similar normalization is performed on the title and features (e.g., category, attribute-value pair) of the first item to return a list of best matching clusters. The SIR module 412 may then create a search query by taking a union of the features of the best matching clusters. The search query may then be used by the SIR module 412 to index active items stored in the database 130 and retrieve a group of items corresponding to a first cluster of the multiple clusters defined by the cluster definitions.

At operation 810, the SIR module 412 may rank each of the retrieved items. In instances in which the first item is an item offered for sale on an online marketplace, the ranking of each item may be based in part on user feedback regarding item or seller quality and a price proximity to the first item. At operation 815, at least one item from the highest ranked items is selected for inclusion in the similar item recommendation.

Figure 9:
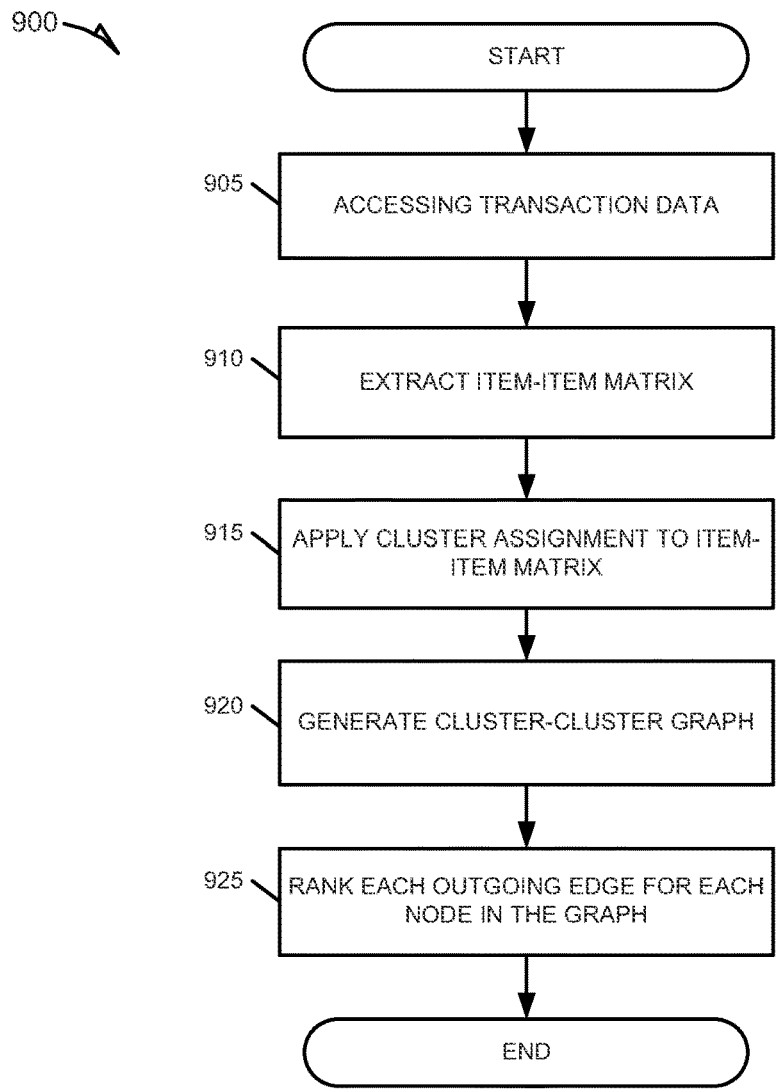
FIG. 9 is a flowchart illustrating an example method of provisioning a related item recommendation, consistent with some embodiments.

FIG. 9 is a flowchart illustrating an example method 900 of generating a related cluster model, consistent with some embodiments. The method 900 may be embodied in computer-readable instructions for execution by one or more processors such that the steps of the method 900 may be performed in part or in whole by the application server 122, and in particular, the related cluster module 404.

At operation 905, the related cluster module 404 may access the transaction data stored in the database 130. The transaction data may include information related to transactions for items sold by merchants via marketplace applications 124. From the transaction data, the related cluster module 404 may extract an item-item co-purchase matrix at operation 910. The item-item co-purchase matrix may represent groupings of items purchased together or within a predefined time period by multiple individuals.

At operation 915, the related cluster module 404 may apply a cluster assignment (e.g., based on the stored cluster definitions) on the item-item co-purchase matrix, which may result in the generation of a cluster-cluster graph at operation 920. In the cluster-cluster graph, an edge from a cluster 'i' to cluster 'j' indicates that a group of users have purchased items in cluster 'j' after buying items in cluster 'i'. At operation 925, the related cluster module 404 may rank the outgoing edges for each node in the cluster-cluster graph to create a related cluster model. The ranking of the outgoing edges may be based on a number of users who co-purchased items from the respective clusters, or a similarity between two clusters.

Figure 10:
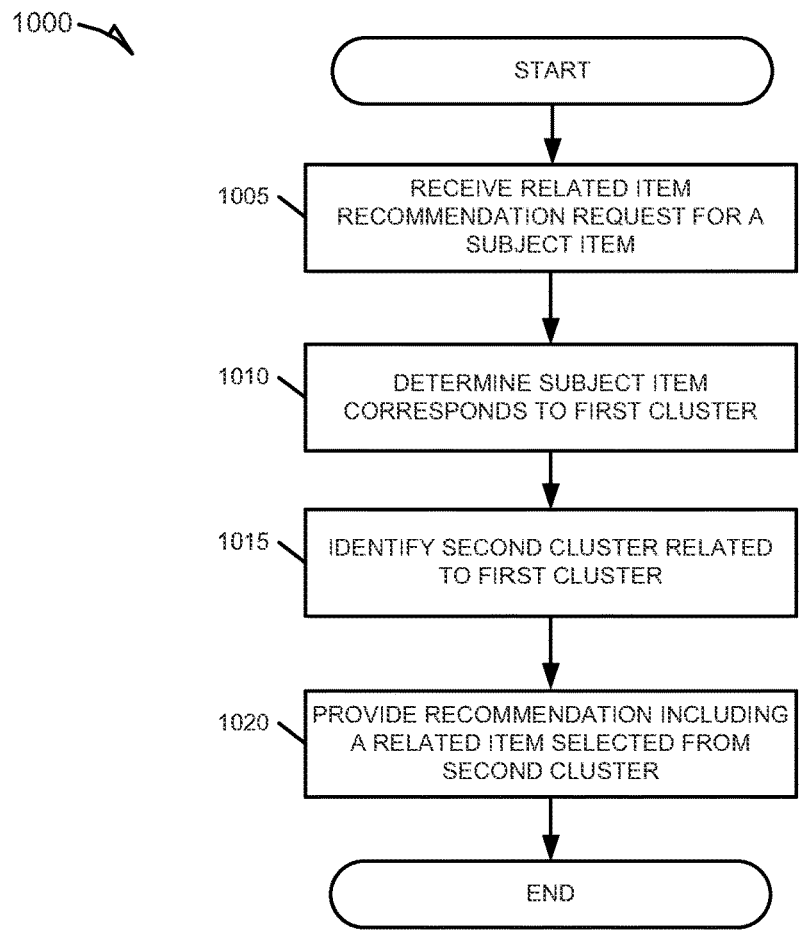
FIG. 10 is a flowchart illustrating an example method of provisioning a related item recommendation, consistent with some embodiments.

FIG. 10 is a flowchart illustrating an example method 1000 of provisioning a related item recommendation, consistent with some embodiments. The method 1000 may be embodied in computer-readable instructions for execution by one or more processors such that the steps of the method 1000 may be performed in part or in whole by the application server 122, and in particular, the RIR module 414.

At operation 1005, the recommendation application 126 may receive a request for a related item for a subject item. The request may be generated in response to a purchase of the subject item by a user, and the recommendation may be for an item that is complementary to the subject item.

At operation 1010, the RIR module 414 may determine that the subject item corresponds to a first cluster. At operation 1015, the RIR module 414 may identify a second cluster related to the first cluster, using the related cluster model generated by the related cluster module 404. Consistent with some embodiments, the operations 1010 and 1015 may collectively include generating normalized expressions using the cluster definitions generated by the cluster definition module 402 and stored in database 130. These normalized search expressions may be compiled and stored in an index (e.g., a lucene index). The RIR module 414 may also perform similar normalization on the title and features (e.g., category, attribute-value pair) of the subject item to return a list of best matching clusters. Further, the RIR module 414 may then utilize the related cluster model generated by the related cluster module 404 to retrieve a number of related clusters and construct a number of separate queries for each related cluster. The RIR module 414 may use these queries to locate and retrieve active items from the inventory data stored in the database 130. Each of the retrieved items may be used by the RIR module 414 to generate a related item recommendation. At operation 1020, the RIR module 414 may provide to the application server 122 a recommendation including at least one related item. In turn, the application server 122 may provide the recommendation to a client device of the user for which the related item request was generated.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
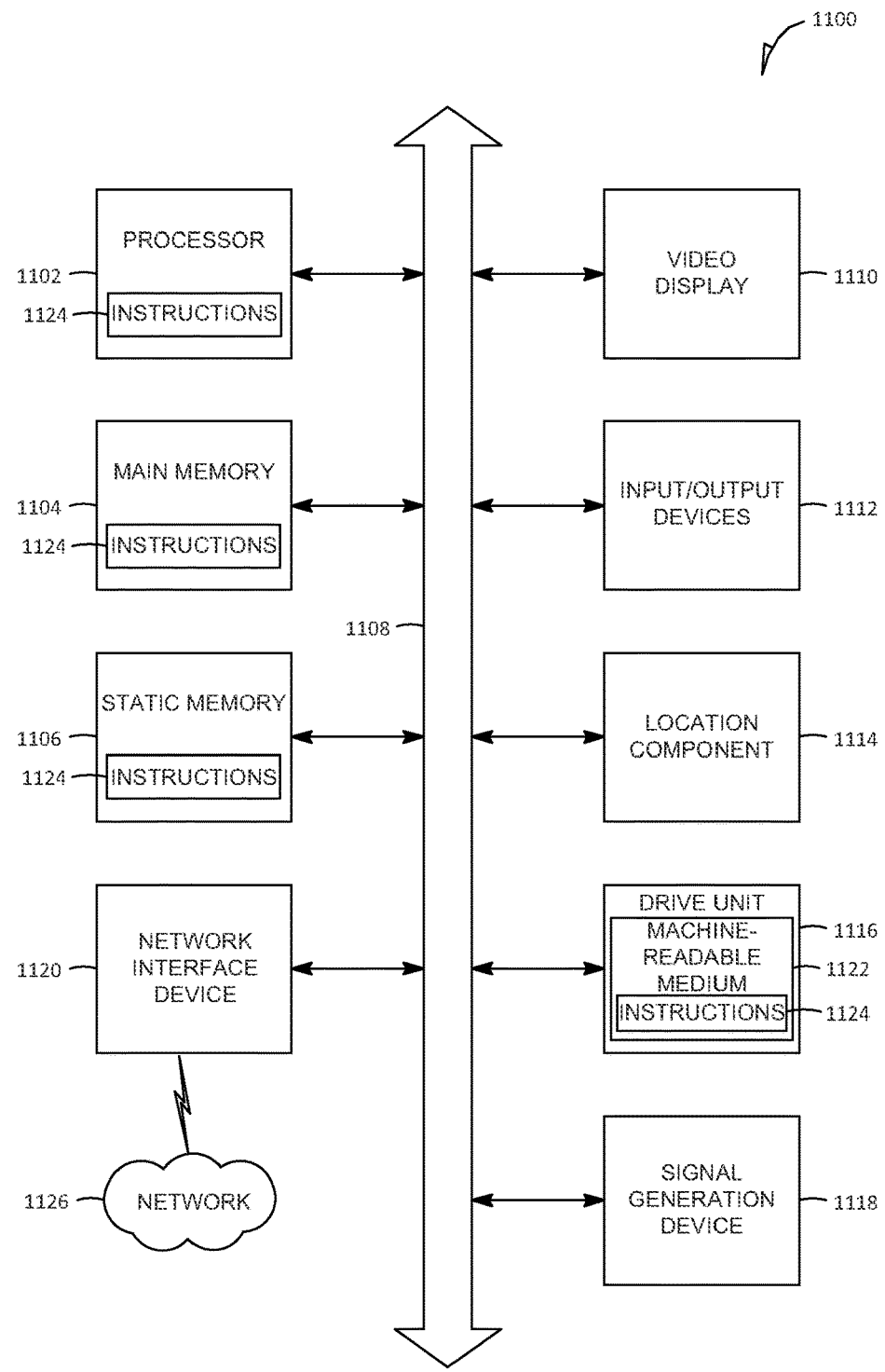
FIG. 11 is a diagrammatic representation of a machine in the example form of a computer system within which a set of instructions for causing the machine to perform any one or more of the methodologies discussed herein may be executed.

FIG. 11 is a diagrammatic representation of a machine in the example form of a computer system 1100 within which a set of instructions for causing the machine to perform any one or more of the methodologies discussed herein may be executed. The computer system 1100 may correspond to client device 106, third party server 114, or application server 122, consistent with some embodiments. The computer system 1100 may include instructions 1124 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a STB, a PDA, a cellular telephone, a smart phone (e.g., iPhone®), a tablet computer, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes one or more input/output (I/O) devices 1112, a location component 1114, a drive unit 1116, a signal generation device 1118 (e.g., a speaker), and a network interface device 1120. The I/O devices 1112 may, for example, include a keyboard, a mouse, a keypad, a multi-touch surface (e.g., a touchscreen or track pad), a microphone, a camera, and the like.

The location component 1114 may be used for determining a location of the computer system 1100. In some embodiments, the location component 1114 may correspond to a GPS transceiver that may make use of the network interface device 1120 to communicate GPS signals with a GPS satellite. The location component 1114 may also be configured to determine a location of the computer system 1100 by using an internet protocol (IP) address lookup or by triangulating a position based on nearby mobile communications towers. The location component 1114 may be further configured to store a user-defined location in main memory 1104 or static memory 1106. In some embodiments, a mobile location enabled application may work in conjunction with the location component 1114 and the network interface device 1120 to transmit the location of the computer system 1100 to an application server or third party server for the purpose of identifying the location of a user operating the computer system 1100.

In some embodiments, the network interface device 1120 may correspond to a transceiver and antenna. The transceiver may be configured to both transmit and receive cellular network signals, wireless data signals, or other types of signals via the antenna, depending on the nature of the computer system 1100.

Machine-Readable Medium

The drive unit 1116 includes a machine-readable medium 1122 on which is stored one or more sets of data structures and instructions 1124 (e.g., software) embodying or used by any one or more of the methodologies or functions described herein. The instructions 1124 may also reside, completely or at least partially, within the main memory 1104, static memory 1106, and/or within the processor 1102 during execution thereof by the computer system 1100, with the main memory 1104 and the processor 1102 also constituting machine-readable media.

Consistent with some embodiments, the instructions 1124 may relate to the operations of an operating system. Depending on the particular type of the computer system 1100, the OS may, for example, be the iOS® operating system, the Android® operating system, a BlackBerry® operating system, the Microsoft® Windows® Phone operating system, Symbian® OS, or webOS®. Further, the instructions 1124 may relate to operations performed by applications (commonly known as "apps"), consistent with some embodiments. One example of such an application is a mobile browser application that displays content, such as a web page or a user interface using a browser.

While the machine-readable medium 1122 is shown in an example embodiment to be a single medium, the term "machine-readable medium" may include a single medium or multiple media (e.g., a centralized or distributed database, and/or associated caches and servers) that store the one or more data structures or instructions 1124. The term "machine-readable medium" shall also be taken to include any tangible medium that is capable of storing, encoding, or carrying instructions (e.g., instructions 1124) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

What is claimed is:

1. A system comprising:
   one or more hardware processors of a machine;
   a cluster definition module configured to perform a first set of operations in an offline process and using the one or more hardware processors, the first set of operations comprising:
      accessing a set of historical queries;
      using the set of historical queries, retrieving, as part of the offline process, a set of items from a first plurality of items of the dynamic database, wherein the dynamic database includes the first plurality of items when the offline process is being performed; and
      grouping, as part of the offline process, the set of items into a plurality of clusters, wherein each cluster is associated with features corresponding a grouping of the set of items from the first plurality of items;
   a similar item recommendation module configured to perform a second set of operations in a runtime process and using the one or more hardware processors, the second set of operations comprising:
      receiving a request for a similar item recommendation for an input item; and
      identifying the similar item recommendation for the input item, wherein identifying the similar item recommendation comprises:
         generating a recommendation search query based on a feature of the input item and a feature of a matching cluster from the plurality of clusters, and
         executing the recommendation search query, based on the dynamic database that includes a second plurality of items when the runtime process is being performed, to identify the similar item recommendation; and
   a display module configured to cause a display of the similar item recommendation in a user interface of a client device.

2. The system of claim 1, wherein the display module is further configured to cause the display of the similar item recommendation in the user interface of the client device based on the executing of the recommendation search query.

3. The system of claim 1, wherein the accessing of the set of historical queries includes selecting a particular historical query of the set of historical queries based on a number of a plurality of previous item retrievals that resulted from a previous search performed via an execution of the particular historical query exceeding a predefined threshold value.

4. The system of claim 1, wherein the cluster definition module is further configured to group the set of items into the plurality of clusters based on a similarity in a plurality of features and wherein the similarity is based on at least one of an item category, or an item attribute.

5. The system of claim 1, wherein the cluster definition module is further configured to:
identify a number of clusters of the plurality of clusters that are duplicates of each other, and
remove all but one of the duplicate clusters.

6. The system of claim 1, wherein the grouping of the set of items into the plurality of clusters comprises applying a k-means clustering algorithm.

7. The system of claim 1, wherein the request for the similar item recommendation is generated in response to receiving a page view request from the client device, the client device being associated with a user, the page view request corresponding to a web page associated with the input item.

8. The system of claim 1, wherein the similar item recommendation module generates the recommendation by:
normalizing one or more of the plurality of the clusters; and
wherein the request for the similar item is based on comparing a normalized expression of the input item and a second normalized expression of at least one of the one or more of the plurality of the clusters.

9. The system of claim 1 further comprising:
a related cluster module configured to perform a third set of operations in the offline process and using the one or more hardware processors, the third set of operations comprising:
accessing transaction data associated with the set of historical queries;
extracting an item-item matrix from the accessed transaction data, wherein the item-item matrix represents groups of complementary associated items of the set of items;
applying a cluster assignment on the item-item matrix to generate a cluster-cluster graph that includes the plurality of clusters and a plurality of edges, wherein plurality of clusters includes a first cluster that includes a third item and a second cluster that includes a fourth item and the plurality of edges includes a first edge between the first cluster and the second cluster that indicates a complimentary association between the fourth item and the third item; and
generating a cluster model that includes a ranking of each of the plurality of edges, wherein a ranking of the first edge indicates a number of complimentary associations between items of the first cluster and items of the second cluster;
a related item recommendation module configured to perform a fourth set of operations at the runtime and using the one or more hardware processors, the fourth set of operations comprising:
in response to receiving an indication of a purchase of the input item, generating a related item recommendation request for another item that is complementary to the input item;
in response to the related item recommendation request, identifying the second cluster based on a determined subject corresponding to the second cluster; and generating a second recommendation that includes the third item, the generating of the second recommendation being based on identifying the first cluster based on the cluster model that includes the ranking of the first edge; and
wherein the display module is further configured to cause a display of the second recommendation in the user interface of the client device.

10. A method comprising:
accessing, as part of an offline process, a set of historical queries from a dynamic database;
using the set of historical queries, retrieving, as part of the offline process, a set of items from a first plurality of items of the dynamic database, wherein the dynamic database includes the first plurality of items when the offline process is being performed;
grouping, as part of the offline process, the set of items into a plurality of clusters, wherein each cluster is associated with features corresponding a grouping of the set of items from the first plurality of items;
receiving, as part of a runtime process, a request for a similar item recommendation for an input item;
identifying the similar item recommendation for the input item, wherein identifying the similar item recommendation comprises:
generating a recommendation search query based on a feature of the input item and a feature of a matching cluster from the plurality of clusters, and
executing the recommendation search query, based on the dynamic database that includes a second plurality of items when the runtime process is being performed, to identify the similar item recommendation; and
causing a display of the similar item recommendation in a user interface of a client device.

11. The method of claim 10, wherein the causing of the display of the similar item recommendation in the user interface of the client device is based on the executing of the recommendation search query.

12. The method of claim 10, wherein the plurality of clusters each comprise a cluster definition in an index.

13. The method of claim 10, wherein the grouping of the set of items into the clusters is based on a similarity in a plurality of features extracted from the category hierarchy, and wherein the similarity is based on at least one of an item title, an item category, or an item attribute.

14. The method of claim 10, further comprising:
identifying a number of clusters of the plurality of clusters that are duplicates of each other, and
removing all but one of the duplicate clusters, and
merging two or more clusters.

15. The method of claim 10, wherein the grouping the set of items into the plurality of clusters further comprises:
extracting one or more features of each item of the first plurality of items from a title of each item;
scoring each feature of each item using a cosine similarity algorithm; and
grouping the set of items from the first plurality of items with a greatest similarity to create the plurality of clusters.

16. The method of claim 10, wherein the similar item recommendation coincides with a request to view a page, the request received from the client device, the client device is associated with a user, and the page includes a representation of the input item.

17. The method of claim 16, wherein the input item is an item offered for sale in a marketplace listing the input item, and the page corresponds to the marketplace listing for the input item.

18. The method of claim 10, wherein the identifying the similar item recommendation further comprises:
- determining that the input item corresponds to a particular cluster definition corresponding to the matching cluster;
- ranking each item included in the particular cluster definition; and
- selecting a highest ranked item from the particular cluster definition, the highest ranked item corresponding to an active item.

19. The method of claim 18, wherein, the first plurality of items is different from the second plurality of items, wherein the second plurality of items is a plurality of active items in the dynamic database.

20. A non-transitory machine-readable storage medium embodying instructions that, when executed by one or more hardware processors of a machine, cause the one or more hardware processors of the machine to perform operations comprising:
- accessing, as part of an offline process, a set of historical queries;
- using the set of historical queries, retrieving, as part of the offline process, a set of items from a first plurality of items of a dynamic database, wherein the dynamic database includes the first plurality of items when the offline process is being performed;
- grouping, as part of the offline process, the set of items into a plurality of clusters, wherein each cluster is associated with features corresponding a grouping of the set of items from the first plurality of items;
- receiving, as part of a runtime process, a request for a similar item recommendation for an input item;
- identifying the similar item recommendation for the input item, wherein identifying the similar item recommendation comprises:
  - generating a recommendation search query based on a feature of the input item and a feature of a matching cluster from the plurality of clusters, and
  - executing the recommendation search query, based on the dynamic database that includes a second plurality of items when the runtime process is being performed, to identify the similar item recommendation; and
- causing a display of the similar item recommendation in a user interface of a client device.

* * * * *